United States Patent [19]
Kuth

[11] Patent Number: 5,664,864
[45] Date of Patent: Sep. 9, 1997

[54] FIBER OPTIC ILLUMINATION SYSTEM

[75] Inventor: Rainer Kuth, Herzogenaurach, Germany

[73] Assignee: Siemens Aktiengesellschaft, Munich, Germany

[21] Appl. No.: 635,523

[22] Filed: Apr. 22, 1996

[30] Foreign Application Priority Data

Apr. 24, 1995 [DE] Germany .................. 195 15 031.7

[51] Int. Cl.$^6$ ...................................... F21V 7/04
[52] U.S. Cl. .................. 362/32; 362/101; 362/264; 362/294
[58] Field of Search ................ 362/32, 294, 96, 362/101, 373, 264, 345; 385/15, 53, 133, 901

[56] References Cited

U.S. PATENT DOCUMENTS

| | | | |
|---|---|---|---|
| 3,400,995 | 9/1968 | Borberg et al. | 362/294 |
| 4,704,660 | 11/1987 | Robbins | 362/294 |
| 4,945,457 | 7/1990 | Yazdani et al. | 362/294 |
| 5,099,399 | 3/1992 | Miller et al. | 362/32 |
| 5,165,773 | 11/1992 | Nath . | |

FOREIGN PATENT DOCUMENTS 1 481 455  7/1977  United Kingdom .
1 565 916  4/1980  United Kingdom .

*Primary Examiner*—James C. Yeung
*Attorney, Agent, or Firm*—Hill, Steadman & Simpson

[57] ABSTRACT

A fiber-optical illumination system has a light source and a light waveguide, in the form of a fiber bundle, having one end optically coupled to the light source via a fluid container which is filled with an optically transparent fluid. Light from the light source passes through a transparent wall in the container, through the fluid, to the light entry face of the light waveguide. The fluid container is in thermal communication with a heat sink, so that heat which is generated at the light entry face of the light waveguide due to absorption by the light waveguide material of radiant emission from the light source can be convected by the fluid away from the light entry face, and dissipated via the fluid container. The system permits light waveguides of temperature-sensitive material, such as plastic, to be used in combination with a high-intensity light source, such as a halogen lamp without heat damage to the waveguide material.

12 Claims, 1 Drawing Sheet

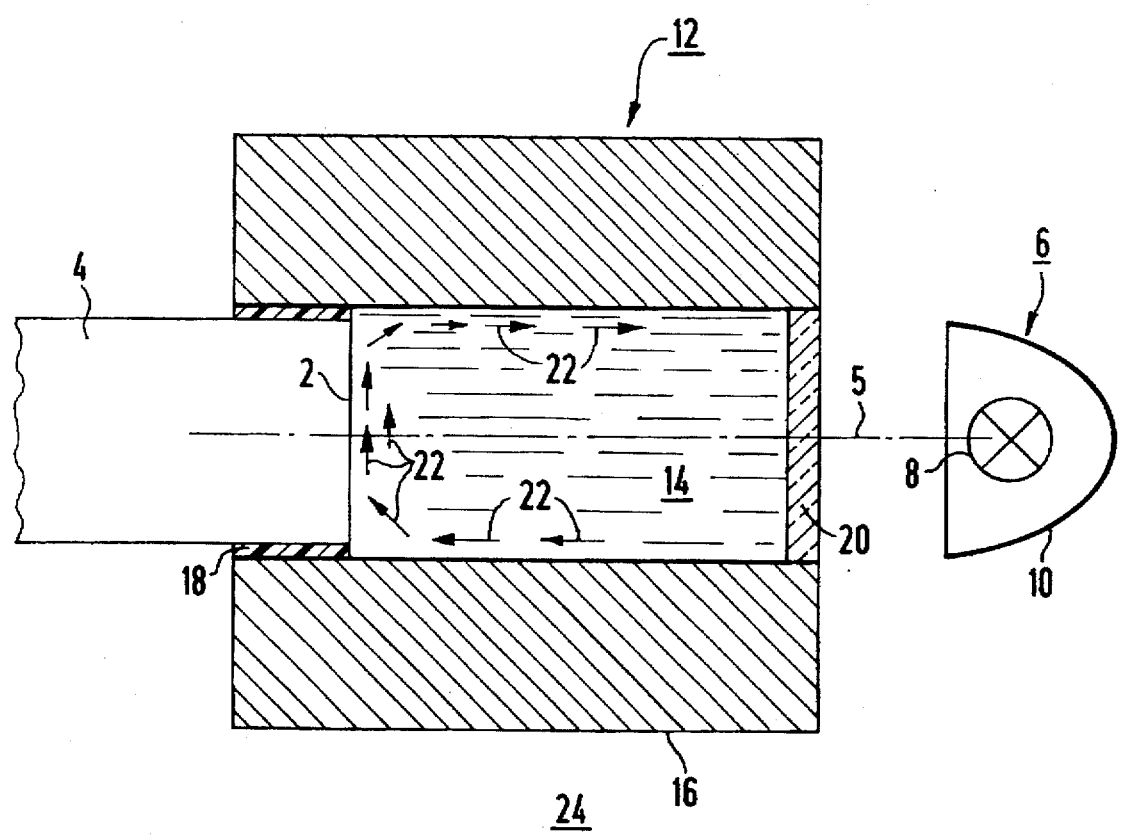

FIBER OPTIC ILLUMINATION SYSTEM

From a safety point of view, however, plastic light waveguides are more favorable than glass optical fiber waveguides, because glass optical fiber waveguides are more susceptible to breakage. If a plastic light waveguide, for safety reasons, is to be employed in combination with a high-intensity light source, then for the above reasons the temperature at the light entry face of the plastic light waveguide must then be limited, for example by air cooling. Even though the air cooling adds to the overall cost of the system, plastic light waveguides with an air-cooled light entry face are occasionally employed instead of glass optical fiber light waveguides for economic reasons, because even though the initial installation may be somewhat more expensive, the lower susceptibility to breakage means that the plastic light waveguides will have to be replaced less often.

SUMMARY OF THE INVENTION

It is an object of present invention to provide a fiber optic illumination system employing a high-intensity light source wherein the temperature at the light entry face of the light waveguide is limited.

The above object is achieved in accordance with the principals of the present invention in a fiber optic illumination system having a fluid container deposed at the end of the light waveguide which is to be optically coupled to the light source. The end of the light waveguide is arranged in the fluid container, and the fluid container is filled with a transparent fluid, and the fluid container is connected to a heat sink. The fluid container has a transparent wall which is optically coupled to the high intensity light source. The heating of the light entry face of the light waveguide results in convection in the fluid, thereby causing the thermal energy to be removed from the waveguide entry face and transferred to the heat sink via the interior surfaces of the fluid container. This system permits light waveguides to be used which are at least partly composed of temperature-sensitive materials such as, for example, plastic. Moreover, adhesives can be employed in the inventive system; such adhesives in a conventional system would lose their adhesive properties due to the high temperatures. Since adhesives are more economical for holding components together than other types of attachment arrangements, the overall illumination system can be manufactured at a lower cost. Although no aerators are employed in the inventive system for cooling purposes, large quantities of heat can be eliminated from the light entry face. Foregoing the use of an aerator also enhances the dependability, i.e. the mean time between failure (MTBF) of the illumination system.

In an embodiment, the fluid in the container has a boiling point which is below the highest permissible temperature for the light waveguide. The temperature at the light entry face is thus limited to the boiling point of the fluid as a result of localized boiling in the region surrounding the entry face. Water is suitable for use as this fluid if 100° C. is not too high for the light waveguide and/or the adhesives which are employed. Otherwise, liquids such as, for example, Fluorinert® available from 3M Co. are suitable, such fluids being commercially available with different boiling points from about 50° C.

DESCRIPTION OF THE DRAWINGS

The single FIGURE is a schematic illustration of a fiber optic illumination system constructed in accordance with the principals of the present invention.

DESCRIPTION OF THE PREFERRED EMBODIMENTS

The FIGURE shows an arrangement, in section, used in an illumination system constructed in accordance with the principals of the present invention for coupling a light source 6, such as high intensity light source, to an end 2 of a light waveguide 4. The end 2 of the light waveguide 4 is optically coupled to the light source 6, so that optical emission generated by the light source 6 can enter into the end 2 of the light waveguide 4, as schematically illustrated by the dot-dash line 5. The light source 6 may include, for example, a halogen lamp 8 arranged in the focus of a parabolic mirror 10, so that the light generated by halogen lamp 8 is substantially completely directed to the end 2. The end 2 (which constitutes the light entry face of the light waveguide 4) is disposed in a fluid container 12 which is filled with an optically transparent fluid 14 such as, for example, water. The fluid container 14 has a thick-walled tubular section 16 composed of a material having good thermal conductivity such as, for example, a metal. The end 2 of the light waveguide 4 projects slightly into the interior of the tubular section 16. The light waveguide 4 is joined in liquid-tight fashion in the tubular section 16, such as by means of a glued connection 18.

The fluid-filled interior of the fluid container 12 is closed with an optically transparent wall 20 at the side thereof facing the light source 6. The wall 20 is composed of a uniformly thick, round plate, such as a glass plate.

During operation, the temperature at the end 2 of the light waveguide 4 rises due to absorption by the material of the light waveguide 4 of radiant emission from the light source 6, primarily absorption in the infrared range. This temperature elevation causes convection occurrence (symbolized by arrows 22) in the fluid 14. The fluid 14 is thereby caused to be conducted along the interior wall of the tubular section 16. Due to the thermal conductivity of material composing the tubular section 16, heat is removed (transferred) from the fluid 14, and this removed heat is dissipated via the exterior surface of the tube section 16 into an ambient air 24, as a heat sink. Depending on the quantity of heat to be eliminated, and depending on the temperature difference between the end 2 and the ambient air 24, the surface area of the fluid container 12 can be enlarged both interiorly and exteriorly, for example by means of ribs, fins and the like.

If it is expected that the temperatures involved will cause the fluid 14 to boil, such as by localized boiling at the region surrounding the end 2, gas-filled recesses (not shown) can be introduced into the tubular section 16 in order to limit any pressure increase caused by the boiling.

Although modifications and changes may be suggested by those skilled in the art, it is the intention of the inventor to embody within the patent warranted hereon all changes and modifications as reasonably and properly come within the scope of his contribution to the art.

I claim as my invention:

1. In a fiber optic illumination system having a light source optically coupled to one end of an optical fiber bundle, the improvement comprising:

a fluid container having an opening in which said end of said fiber bundle is disposed, said fluid container being otherwise completely closed and containing an optically transparent fluid;

a heat sink in thermal communication with an exterior of said fluid container; and said fluid container having an optically transparent wall disposed in a path of optical and thermal emission from said light source, said optical radiant emission from said light source passing through said optically transparent wall and through said optically transparent fluid to said end of said fiber bundle and said radiant thermal emission being dissipated exclusively by convection via said heat sink.

2. The improvement of claim 1 wherein said light source comprises a high intensity light source.

3. The improvement of claim 2 wherein said high intensity light source comprises a halogen lamp.

4. The improvement of claim 1 wherein said fiber bundle comprises a light waveguide at least partially composed of plastic.

5. The improvement of claim 1 wherein said light source comprises a high intensity light source, and wherein said fiber bundle comprises a light waveguide composed at least partially of plastic.

6. The improvement of claim 1 wherein said fiber bundle has a highest permissible temperature associated therewith, and wherein said fluid comprises a fluid having a boiling point below said highest permissible temperature.

7. The improvement of claim 1 wherein said fluid container comprises a fluid container having an exterior surface for promoting heat emission therefrom.

8. A fiber optic illumination system comprising:

a high intensity light source;

a light waveguide composed at least partially of a plastic material and having an end forming a light entry face for said light waveguide;

a fluid container containing an optically transparent fluid and an opening receiving said light entry face of said light waveguide in contact with said fluid, said fluid container being otherwise completely closed; and said fluid container having an optically transparent wall disposed between said light source and said fluid, said light source emitting radiant optical and thermal emission, said radiant optical emission passing through said transparent wall and through said fluid to said entry face of said light waveguide and said radiant thermal emission being dissipated exclusively by convection via said fluid container.

9. A fiber optic illumination system as claimed in claim 8 wherein said fluid container, except said transparent wall, is composed of thermally conductive material.

10. A fiber optic illumination system as claimed in claim 9 wherein said thermally conductive material comprises metal.

11. A fiber optic illumination system as claimed in claim 7 wherein said fluid container comprises a container having a tubular interior chamber in which said transparent fluid is disposed.

12. A fiber optic illumination system as claimed in claim 10 wherein said tubular chamber is closed at one end by said optically transparent wall and receives said light entry face of said light waveguide at an opposite end.

* * * * *